UNITED STATES PATENT OFFICE.

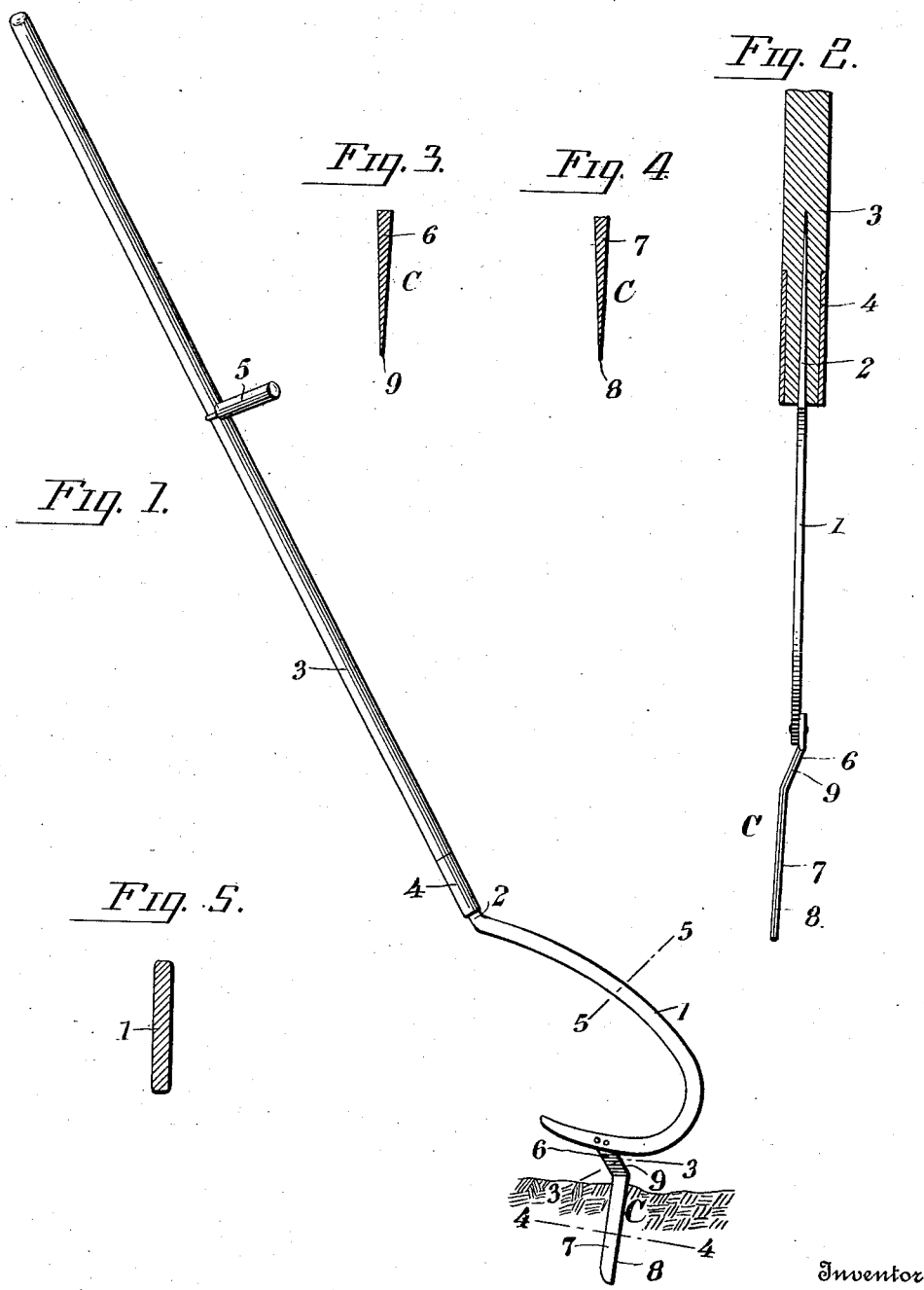

OLE R. HAUSKEY, OF LAKE PRESTON, SOUTH DAKOTA.

GARDEN-TOOL.

1,069,007. Specification of Letters Patent. Patented July 29, 1913.

Application filed December 11, 1912. Serial No. 736,162.

*To all whom it may concern:*

Be it known that I, OLE R. HAUSKEY, a citizen of the United States, residing at Lake Preston, in the county of Kingsbury and State of South Dakota, have invented new and useful Improvements in Garden-Tools, of which the following is a specification.

This invention relates to garden tools, and it has for its object to produce a simple and effective tool for breaking the clods and for stirring and agitating the soil adjacent to growing plants and for holding such plants in a position where they will not be liable to be injured during the operation.

A further object of the invention is to produce a simple and effective hand tool combining in one a plant holding implement and a soil engaging implement.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing, Figure 1 is a side elevation of a garden tool constructed in accordance with the invention. Fig. 2 is a top plan view partly in section. Fig. 3 is a sectional detail view enlarged taken on the line 3—3 in Fig. 1. Fig. 4 is a sectional detail view enlarged taken on the line 4—4 in Fig. 1. Fig. 5 is a sectional detail view, enlarged, taken on the line 5—5 in Fig. 1.

Corresponding parts in the several figures are denoted by like characters of reference.

A hook 1 of suitable dimensions, say about twelve inches in length all over, is provided at one end with a tang 2, socketed in a handle 3 having a ferrule 4. The handle is provided with a grip member 5 extending at an angle therefrom and adapted to be grasped by one hand of the operator who takes hold of the handle proper with the other hand. The hook 1 is made of flat material, such as iron or steel, and of an outline resembling that of an ordinary sickle, but the edges of the hook, as will be seen very clearly by reference to Fig. 5, are dull, blunt and preferably rounded so that the hook may be used for engaging and manipulating plants without danger of injury thereto.

Secured on the bill of the hook, relatively near the point thereof, is a cutting member C of angular shape, said member having an arm 6 which projects laterally from the hook, being preferably disposed at an obtuse angle with respect to the flat faces of the hook, and an arm 7 which projects downwardly with respect to the hook and the arm 6, at an obtuse angle to the latter. The arms 6 and 7 of the member C have cutting edges 9 and 8 which are sharpened to a degree which will enable the member to be readily utilized for the purpose of cutting the roots and stems of weeds and objectionable plants. The cutting member C, as well as the hook member 1, are to be made of material sufficiently strong and rigid to enable the member C to be utilized for digging into the soil so as to agitate the same, and break the clods thereof.

In the practical use of the improved implement, the handle 3 and the grip portion 5 are grasped by the hands of the operator, and the hook 1 is now utilized to lift and gather together the plants that are to be cultivated. By means of the hook the plants may be supported in an out of the way position while the cutting member C is inserted into the soil, as close to the roots of the plant as may be desired, the tool being meanwhile manipulated to cause the cutting member to loosen and agitate the soil and, if necessary, to sever the roots as well as the stalks of weeds and surplus plants that it may be desired to eradicate.

It will be seen that the improved tool is exceedingly simple in its construction, and it may be utilized with highly beneficial results, because the soil may be loosened as close to the roots of the growing plants as may be desired without injury to such plants, but permitting air and water to have free access to the roots. A highly important advantage is that the tool may be used with slight expenditure of strength and without necessity for the operator to bend over or to otherwise assume a cramped and inconvenient position. Another important advantage of this tool is that it will not cover up the young and small plants, because the dirt will slide over the knife or cutter and will not be pushed or displaced laterally, as in the case when other tools are employed. Again, this tool will cut all the weeds and leave a fine dirt mulch after cultivation, while a shovel cultivator will cover up a great many weeds which have not been cut and which will continue to grow and in a short time will emerge from the soil and obstruct the growth of the crop as much as ever. With the improved tool the weeds will be cut, and will require a much longer time to start anew, thus giving the crop an opportunity to get a good start.

Having thus described the invention, what is claimed as new, is:—

1. A garden tool comprising a hook fashioned to resemble a sickle and having blunt rounded plant-engaging edges, whereby plants may be engaged and held without injury, the said hook being provided with a cutting member extending outwardly therefrom for cutting and digging about the plant which is being held and protected within the hook.

2. A garden tool comprising a hook-shaped implement having a handle whereby it may be operated to engage, uphold and protect the stems and leaves of growing plants, and a cutting and digging member mounted upon and extending outwardly from said hook for cutting and digging about plants that are being held and protected within the hook.

3. A garden tool comprising a hook having a flat and relatively wide blade portion with blunt edges, said hook having a tang at one end, a handle in which said tang is socketed, and a cutting member connected with one side face of that portion of the hook remote from the handle and extending outwardly therefrom, said cutting member having a sharp edge and a blunt back.

4. A garden tool comprising a flat, sickle-shaped hook having a tang at one end, the edges of said hook being blunt, a handle in which the tang is socketed and from which the hook extends in a forward direction, and an angular cutting member having one arm connected with a side face of the hook remote from the handle and extending forwardly therefrom, and an arm extending downwardly at an obtuse angle with respect to the first mentioned arm, said arms having sharp edges.

In testimony whereof I affix my signature in presence of two witnesses.

OLE R. HAUSKEY.

Witnesses:
E. C. OLSTON,
CHAS. A. ALSETH.

---

Copies of this patent may be obtained for five cents each, by addressing the "Commissioner of Patents, Washington, D. C."